(12) United States Patent
Qin (10) Patent No.: US 9,586,130 B1
(45) Date of Patent: Mar. 7, 2017

(54) PARKOUR WHEELED BOOT FOR INCREASING MOVING SPEED

(71) Applicant: Bo Qin, Yunnan Province (CN)

(72) Inventor: Bo Qin, Yunnan Province (CN)

( * ) Notice: Subject to any disclaimer, the term of this patent is extended or adjusted under 35 U.S.C. 154(b) by 0 days.

(21) Appl. No.: 15/185,045

(22) Filed: Jun. 17, 2016

(30) Foreign Application Priority Data

May 12, 2016 (CN) .......................... 2016 1 0313059

(51) Int. Cl.
| | |
|---|---|
| *A63C 17/08* | (2006.01) |
| *A63C 17/12* | (2006.01) |
| *A63C 17/00* | (2006.01) |
| *A63C 17/22* | (2006.01) |
| *A43B 5/16* | (2006.01) |

(52) U.S. Cl.
CPC ................ *A63C 17/12* (2013.01); *A43B 5/16* (2013.01); *A63C 17/0046* (2013.01); *A63C 17/08* (2013.01); *A63C 17/223* (2013.01); *A63C 17/226* (2013.01); *A63C 2203/12* (2013.01); *A63C 2203/20* (2013.01)

(58) Field of Classification Search
CPC ..... A63C 17/08; A63C 17/12; A63C 17/0046; A63C 2203/20
USPC ........................................ 280/11.24; 180/181
See application file for complete search history.

(56) References Cited

U.S. PATENT DOCUMENTS

| | | | | | |
|---|---|---|---|---|---|
| 1,587,749 | A | * | 6/1926 | Bierly .................... | A63B 25/10 280/11.115 |
| 2,675,243 | A | * | 4/1954 | King ...................... | A63C 17/08 267/225 |
| 2,931,012 | A | * | 3/1960 | Kosach .................. | A63C 17/08 280/11.24 |
| 2,980,436 | A | * | 4/1961 | Kosach .................. | A63C 17/08 280/11.24 |
| 3,330,571 | A | * | 7/1967 | Pierce .................... | A63B 25/04 280/11.24 |
| 3,374,002 | A | * | 3/1968 | Lewis .................... | A63C 17/08 280/11.24 |
| 3,663,031 | A | * | 5/1972 | Young .................... | A63C 17/08 280/11.204 |
| 3,997,179 | A | * | 12/1976 | de Blois ................ | A63C 17/08 280/11.24 |
| 4,108,451 | A | * | 8/1978 | Scheck, Sr. ............ | A63C 17/18 280/11.212 |
| 4,194,751 | A | * | 3/1980 | Shinmura .............. | A63B 25/04 280/11.201 |

(Continued)

*Primary Examiner* — Jeffrey J Restifo (57) ABSTRACT

A parkour wheeled boot for increasing moving speed, having self-balancing function, wearable on a respective leg of a user. Each boot has a wearing mechanism, a shock reduction mechanism, a drive mechanism, a motion transmission mechanism, a power mechanism and a control mechanism. The wearable mechanism has a pedal, a pedal fixation rack, calf supporting plates, and magnetic pieces or belt and buckle. The shock reduction mechanism has a spring seat, springs and a cover. The drive mechanism has a motor having a hollowed center, and also an inner wall of a bearing. The motion transmission mechanism has an outer wall of the bearing, a wheel hub, and a rubber tire. The power mechanism has batteries, battery smart protection control board, ports and connection wires. The control mechanism is a single board unit with microprocessor, angular speed sensor, acceleration sensor, pressure sensor and relevant electronic components.

3 Claims, 7 Drawing Sheets

(56) References Cited

U.S. PATENT DOCUMENTS

| | | | | |
|---|---|---|---|---|
| 4,310,168 A * | 1/1982 | Macaluso | A63C 17/08 | 280/11.24 |
| 4,363,493 A * | 12/1982 | Veneklasen | A63C 17/08 | 280/11.204 |
| 4,541,643 A * | 9/1985 | Pavincic | A63C 17/004 | 280/11.201 |
| 4,709,937 A * | 12/1987 | Lin | A63C 17/0086 | 280/11.209 |
| 5,106,110 A * | 4/1992 | Williamson | A63C 17/08 | 188/72.9 |
| 5,114,166 A * | 5/1992 | McCosker | A63C 17/0046 | 280/11.28 |
| D347,044 S * | 5/1994 | Slack | | 280/11.24 |
| 5,779,247 A * | 7/1998 | Anselmo | A63C 17/08 | 280/11.24 |
| 5,951,027 A * | 9/1999 | Oyen | A63C 17/0046 | 280/11.208 |
| 6,059,062 A * | 5/2000 | Staelin | A63C 17/12 | 180/181 |
| 6,065,763 A * | 5/2000 | Adams, Jr. | A63C 17/0046 | 280/11.19 |
| 6,224,076 B1 * | 5/2001 | Kent | A63C 17/0046 | 280/11.28 |
| 6,382,640 B1 * | 5/2002 | Killian | A63C 17/08 | 280/11.24 |
| 7,980,568 B2 * | 7/2011 | Chen | A63C 17/01 | 280/11.24 |
| 8,616,313 B2 * | 12/2013 | Simeray | B62K 1/00 | 180/181 |
| 2005/0121238 A1 * | 6/2005 | Ishii | A63C 17/08 | 180/65.1 |
| 2010/0109266 A1 * | 5/2010 | Jenkins | A63C 17/006 | 280/11.204 |
| 2011/0059664 A1 * | 3/2011 | Poichot | A63C 17/0066 | 441/74 |
| 2012/0119455 A1 * | 5/2012 | Sun | A63C 17/004 | 280/11.19 |
| 2012/0313336 A1 * | 12/2012 | Chen | A63C 17/08 | 280/11.24 |
| 2013/0161916 A1 * | 6/2013 | Chen | A63C 17/00 | 280/11.24 |
| 2015/0042054 A1 * | 2/2015 | Wu | A63C 17/12 | 280/11.115 |
| 2015/0107922 A1 * | 4/2015 | Bigler | A63C 17/12 | 180/181 |
| 2015/0196831 A1 * | 7/2015 | Treadway | A63C 17/12 | 180/181 |
| 2015/0352430 A1 * | 12/2015 | Treadway | A63C 17/12 | 701/22 |
| 2016/0121198 A1 * | 5/2016 | Doerksen | A63C 17/01 | 701/22 |
| 2016/0136508 A1 * | 5/2016 | Bigler | A63C 17/014 | 180/181 |
| 2016/0213999 A1 * | 7/2016 | Treadway | A63C 17/0046 | |

\* cited by examiner

PARKOUR WHEELED BOOT FOR INCREASING MOVING SPEED

BACKGROUND OF THE INVENTION

The present invention relates to the technical field of wearable equipment for enhancing personal mobility, and more specifically relates to a parkour wheeled boot for increasing moving speed.

Among different kinds of personal travelling equipment available nowadays, a single-wheel vehicle is moved by a manually driven wheel, a bicycle comprises two longitudinally aligned wheels manually driven and integrated with the bicycle, an electrical single-wheel vehicle is moved by an electrically driven power wheel, an electrical two-wheel self-balance vehicle comprises two laterally aligned power wheels integrated with the vehicle, and an electrical scooter comprises two to four electrically driven scooter wheels integrated with the scooter. Some other equipment such as a roller skate is a device that may advance the body forward by moving the feet alternately, and comprising two or more than two non-powered wheels or multiple powered wheels driven by the feet. A skateboard is also provided which is adapted from a surfboard for moving on the ground laterally. The major differences of the present invention compared with the prior arts are the use of two independent self-balancing power wheels which move to advance the body forward in accordance with the alternate movement of the feet, and that the power wheels are driven respectively by a circular electromagnetic motor with a hollowed center or a circular motor with a hollowed center and without an iron core.

Nowadays, an electrical single-wheel vehicle or a two-wheel self-balance vehicle uses conventional disc type motor structure. The motor part weighs from 3 to 5 kg, and the entire equipment weighs from around 10 kg to dozens kg. Such equipment is driven by batteries but its ability for long distance travel is hindered because the equipment is too heavy. Therefore, it is a continuous pursuit in the market to develop a light-weight personal travelling equipment.

Due to the use of circular electromagnetic motor having a hollowed center or the circular motor having a hollowed center and without an iron core, the weight of the motor can be maximally reduced, the motor efficiency is enhanced and the number of motion transmission components is reduced, thereby increasing operating efficiency, lowering the chance of mechanical failure and facilitating installation and maintenance.

In August 2015, the inventor of the present invention has filed a patent application for a kind of gear motion transmission mechanism of a parkour wheeled boot in China. The invention is called "all terrain whirling wheel". Its functions are applicable to the present invention. However, due to the use of light-weight but high rotational speed aeromodelling motor with gear arrangements for deceleration and motion transmission, it does not balance well at the initial start-up phase in actual practice, and there are too many motion transmission components with complicated arrangements, and thus creating troubles on manufacturing and maintenance. The present invention makes significant improvements of its structure. Instead of aeromodelling motor and gear motion transmission mechanism, the present invention is driven by circular electromagnetic motor having a hollowed center or circular motor having a hollowed center and without an iron core. This type of driving method is a direct driving method which reduces intermediate motion transmission components, thereby enhancing motion transmission efficiency and also the stability and efficiency of power output. Due to simplified motion transmission components, it is much easier and faster for the manufacture, installation and maintenance of the boot of the present invention. The chances of machine failure caused by a structure jammed with too many components are also reduced.

BRIEF SUMMARY OF THE INVENTION

An object of the present invention is to provide a kind of parkour wheeled boot for increasing moving speed. Each boot has an independent self-balancing power wheel; each boot is fixed to an outer side of a respective leg of the user. The boots on both legs move to advance the body forward in accordance with the natural alternate movement of the feet of the user. Therefore, the user moves forward by natural alternate movement of the feet assisted by the rolling of each power wheel of each boot. Accordingly, the user can move in a high speed 5-8 times faster than walking on foot alone. The user may then walk as if there are wings on their feet.

To fulfill the above object, the present invention provides the following technical solution: A parkour wheeled boot for increasing moving speed, each being worn at an outer side of a respective leg; the boot on the left leg is symmetrical with the boot on the right leg; each boot comprises a wearing mechanism, a shock reduction mechanism, a drive mechanism, a motion transmission mechanism, a power mechanism and a control mechanism; the wearing mechanism comprises a pedal, a pedal fixation rack, an upper calf supporting plate and a lower calf supporting plate; the pedal is mounted on the pedal fixation rack; the pedal fixation rack is fixedly connected to a shock reduction spring seat cover; the lower calf supporting plate is connected with an outer side of a semi-circular shock reduction spring seat; the upper calf supporting plate and the lower calf supporting plate are mutually connected through insertion or folding.

The shock reduction mechanism and the wearing mechanism are mutually connected; the shock reduction mechanism comprises the semi-circular shock reduction spring seat, shock reduction springs and the shock reduction spring seat cover; the shock reduction springs are mounted on the semi-circular shock reduction spring seat; the shock reduction springs and the semi-circular shock reduction spring seat are connected via screw bolts; the semi-circular shock reduction spring seat of the shock reduction mechanism is connected with the drive mechanism; compressibility of each of the shock reduction springs is around 2 cm to ensure better buffering ability of the boot on rough road surfaces.

The drive mechanism comprises a circular electromagnetic motor having a hollowed center or a circular motor having a hollowed center and without an iron core, formed by a first U-shape end cap stator supporter, a second U-shape end cap stator supporter, a super thin bearing having a large diameter bore, a stator iron core, and an outer rotor of magnetic steel; the stator iron core is provided inside the super thin bearing having a large diameter bore, and the outer rotor of magnetic steel is provided external thereto; the first U-shape end cap stator supporter and the second U-shape end cap stator supporter are parts of the drive mechanism visible from outside; interior sides of the first and second U-shape end cap stator supporters are tightly fitted with an inner wall of the super thin bearing having a large diameter bore, and the first and second U-shape end cap stator supporters are driven by power generated by separation magnetic force from the outer rotor of magnetic steel, the stator iron core and windings.

The motion transmission mechanism comprises an outer wall of the super thin bearing having the large diameter bore, a wheel hub and a tire; the motion transmission mechanism has a function of transferring the power transmitted from the drive mechanism to rolling motion on the ground surface.

The power mechanism comprises specified type separable modular rechargeable batteries and their ports; the power mechanism supplies power to the entire boot; "specified type" means specifying a certain capacity for one independent modular unit; "separable" means separable with the boot under weight limitation, and in this case supplying power to the boot through connection wire or wireless means; each modular unit is capable of quickly assembling with other modular units through hidden fasteners to provide power for continuous use for long distance travel.

The control mechanism is a control board being a single board unit; the control board is an equipment control center; the control board not only has those relevant components found in a control board of a conventional self-balancing vehicle such as an angular speed sensor and an acceleration sensor, but also has a pressure sensor which controls power output and power cut of the whirling wheel in accordance with alternate movement of user's feet on and off the ground.

The shock reduction mechanism, the drive mechanism, the motion transmission mechanism, the power mechanism and the control mechanism together form the power wheel; each power wheel is an independent self-balancing power wheel having a weight under 4 kg and a size of 6-20 inches. Each boot is fixed to an outer side of a respective leg of the user. The boots on both legs move to advance the body forward in accordance with the natural alternate movement of the feet of the user.

When power is shut down or depleted, the boot may still provide non-powered assistance in continued travelling because it is designed in accordance with the natural physical development of human beings and operates in accordance with the walking traits of human beings.

The present invention has the following advantages compared with the prior arts:

1. The boot of the present invention has a drive mechanism of the wheel hub comprising a circular electromagnetic motor having a hollowed center or a circular motor having a hollowed center and without an iron core. The weight of the motor can be maximally reduced, the motor efficiency is enhanced and the number of motion transmission components is reduced, thereby lowering the chances of mechanical failure and facilitating installation and maintenance. Each of the parkour wheeled boot has a weight of under 4 kg.

2. In a conventional electrical single-wheel vehicle, the batteries are all fixed inside the vehicle. In order to increase its power of continued long distance travel, more batteries are required, meaning that the space required will be larger, the entire vehicle will be heavier, and its price will also be higher. However, it is noted that apart from the batteries, its other components have the same performance as those in a vehicle of the same standard. In fact, in actual uses of personal travelling equipment, 85% have a travel distance within 10 km. It is not economical to purchase batteries of large capacity in order to cater the need of the 15% minority because the initial purchase of the equipment will become expensive, and the batteries of large capacity will significantly increase the weight of the equipment and thus increases the difficulty of carrying the equipment when travelling. The present invention uses specified type separable modular batteries in which each modular unit has a capacity of 100 WH-160 WH. When the entire boot has a weight under 4 kg, the batteries can be placed inside the boot, or can be carried by a wearable waist battery belt that comes with the boot during purchase. In case of long distance travel, a wearable backpack battery pack can be additionally purchased or rent to supply power to the boot via connection wire or via wireless means. The waist battery belt contains only one specified battery unit, while the backpack battery pack contains a plurality of specified battery units. It is advantageous because users need not consider their travel distances during purchase. They may only need to purchase a standard specified battery. Accordingly, the cost of purchase is reduced and, 85% of travels can be completed with light-weight equipment.

3. A conventional electrical single-wheel vehicle does not have any shock reduction mechanism, thereby producing aching pain on the back head and resulting in easy injury of the knees when travelling on rough road surfaces. It is therefore not comfortable to travel with such vehicle. The present invention uses shock reduction mechanism. The shock reduction springs are highly resilient each having compressibility of around 2 cm to ensure that the boot has better buffering effect on rough road surfaces and is comfortable for users to use.

4. A conventional type of electrical self-balancing vehicle, including electrical single-wheel vehicle and electrical two-wheel self-balancing vehicle, requires a user to stand on a pedal board with the feet positioned side by side all the time during operation. When the user travels more than 10 km, the feet will feel numb due to immobility for a long period of time and the impact force caused by rough road surfaces. Especially in windy winter, severe infliction on the body parts below the hip will be caused by cold air, and users who have been using the vehicle for a long period of time may then suffer from rheumatic diseases. The present invention is adapted to advance the user's body forward through the natural alternate movement of the feet during walking, thereby totally eliminating the above described disadvantages. When using the present invention during cold days, users may run on their feet to heat up their bodies to fend off the infliction of cold wind, thereby maintaining healthy bodies of the users.

5. A conventional type of electrical self-balancing vehicle, including electrical single-wheel vehicle and electrical two-wheel self-balancing vehicle, is driven solely by batteries. When the batteries have power, users can use the vehicle. However, the vehicle becomes useless if the batteries have no power. By contrast, the present invention is designed in accordance with the natural physical development of human beings and operates in accordance with the walking traits of human beings, the present invention can still function to advance the body forward solely and manually through the alternate movement of the feet to provide non-powered assistance in continued travelling even when the power is cut off or depleted. Therefore, the present invention is a wearable device operable with or without battery power.

6. A conventional type of electrical self-balancing vehicle, including electrical single-wheel vehicle and electrical two-wheel self-balancing vehicle, uses gyroscope to achieve self-balancing. When users use the vehicle, their feet have to be placed side by side on the vehicle to advance the vehicle forward by leaning their bodies forward. To obtain a faster speed, users have to lean their bodies forward by a greater angle. As such, the natural human instinct of self-balancing is subdued and entirely replaced by the control of a mechanical device. In case of abrupt machine failure, the vehicle can by no means guarantee safety of the users. By contrast, the present invention is designed to totally abide by the natural physical development of human beings because it functions to advance the body forward in accordance with the natural alternate movement of the user's feet. Accordingly, the present invention fully respects and maintains the natural human self-balancing instinct (in human beings, stepping forward is a repeated process wherein each step is made from losing balancing to restoring balance). Even though the present invention is equipped with power-up and self-balancing functions, its design in accordance with the natural alternate movement of the user's feet enables each step of the user being within the control of the user's self-balancing ability. In case of abrupt machine failure, users can respond and adjust their bodies from losing balance to restoring balance according to their own instinct or subconsciousness. Therefore, various risks can be effectively avoided to ensure personal safety.

FIGURE REFERENCES

1a: upper calf supporting plate; 1b: lower calf supporting plate; 2: pedal fixation rack; 3: pedal; 4: rubber tire; 5: wheel hub; 6a: first U-shape end cap stator supporter; 6b: second U-shape end cap stator supporter; 7: control board; 8: batteries; 9: shock reduction spring seat cover; 10: shock reduction springs; 11: semi-circular shock reduction spring seat; 12: stator iron core; 13: super thin bearing having a large diameter bore; 14: outer rotor of magnetic steel; 21: wearing mechanism; 22: shock reduction mechanism; 23: drive mechanism; 24: motion transmission mechanism; 25: power mechanism; 26: control mechanism.

DETAILED DESCRIPTION OF THE INVENTION

The technical solution disclosed by an embodiment of the present invention will be clearly and fully described below with reference to the drawings. Obviously, the embodiment described below is only one of different embodiments of the present invention. All other embodiments attainable by a person skilled in this field of art based on the embodiment disclosed herein without any inventive laboring should also fall within the scope of protection of the present invention.

The technical solution of the present invention: A parkour wheeled boot, each being fitted on one leg during use, and each comprising an independent power wheel which achieves self-balancing. Through a pedal and a calf supporting plate, the boot is fitted on an outer side of a respective leg by means of magnetic lock or belt and buckle. Two feet of a user each fitted with such a boot moves alternately to advance the body forward.

With reference to FIGS. 1-11, the parkour wheeled boot comprises six major mechanisms: a wearing mechanism 21, a shock reduction mechanism 22, a drive mechanism 23, a motion transmission mechanism 24, a power mechanism 25, and a control mechanism 26.

Figure 1:
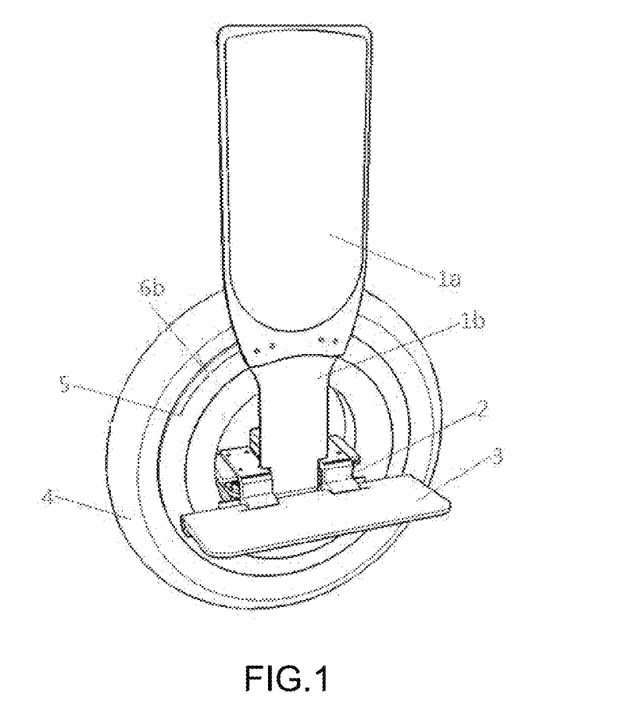
FIG. 1 illustrates a parkour wheeled boot of the present invention.
Figure 10:
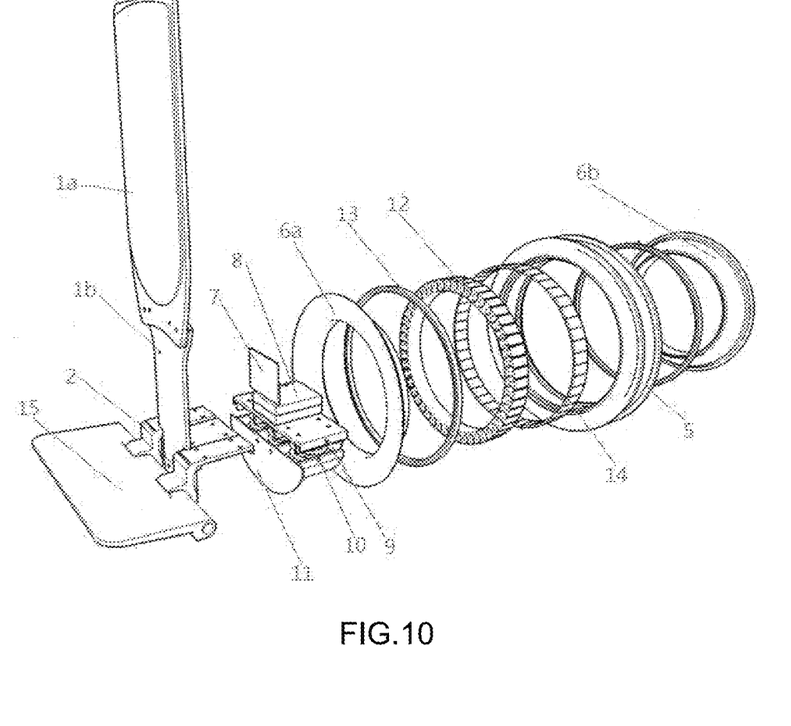
FIG. 10 is an exploded view of the present invention.
Figure 11:
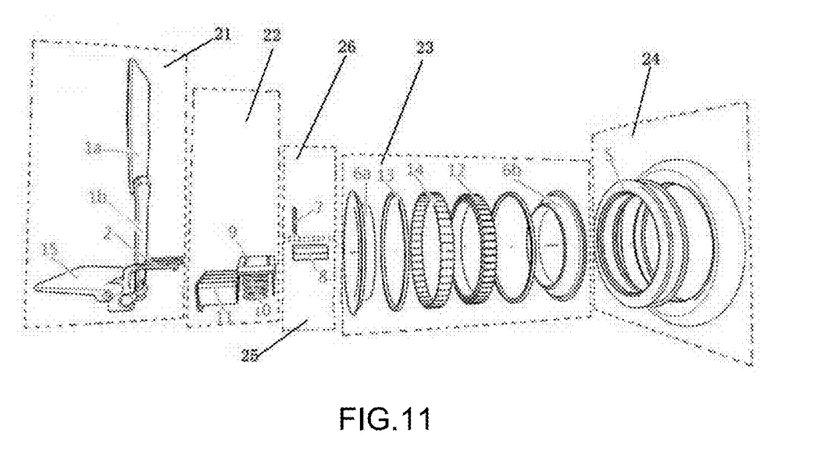
FIG. 11 shows the six major mechanisms of the present invention.

The wearing mechanism 21 comprises a pedal 3, a pedal fixation rack 2, an upper calf supporting plate 1a, a lower calf supporting plate 1b, and magnetic pieces or buckle and belt for fixing with a human body.

The shock reduction mechanism 22 comprises semi-circular shock reduction spring base 11, shock reduction springs 10 and a shock reduction spring base cover 9.

Figure 2:
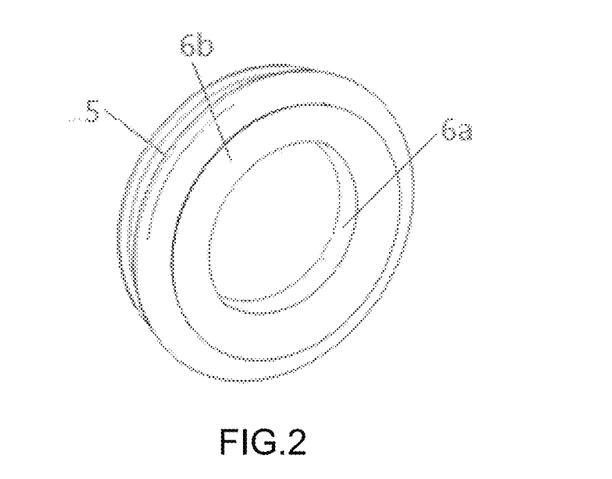
FIG. 2 illustrates a circular motor having a hollowed center according to the present invention.
Figure 3:
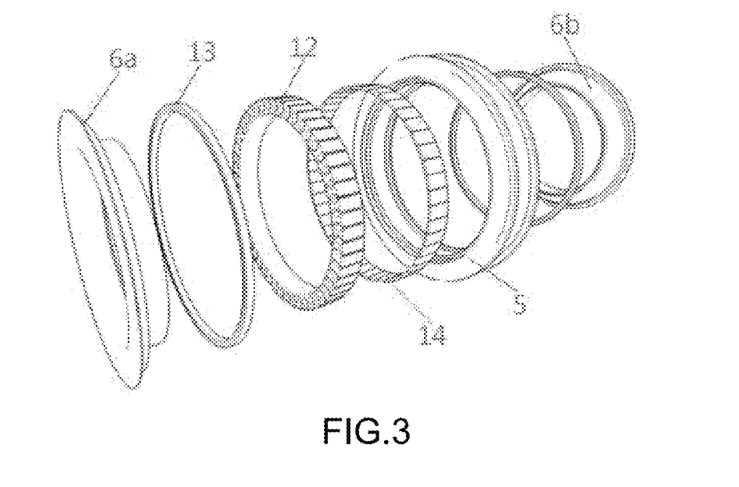
FIG. 3 is an exploded view of the circular motor having a hollowed center according to the present invention.
Figure 4:
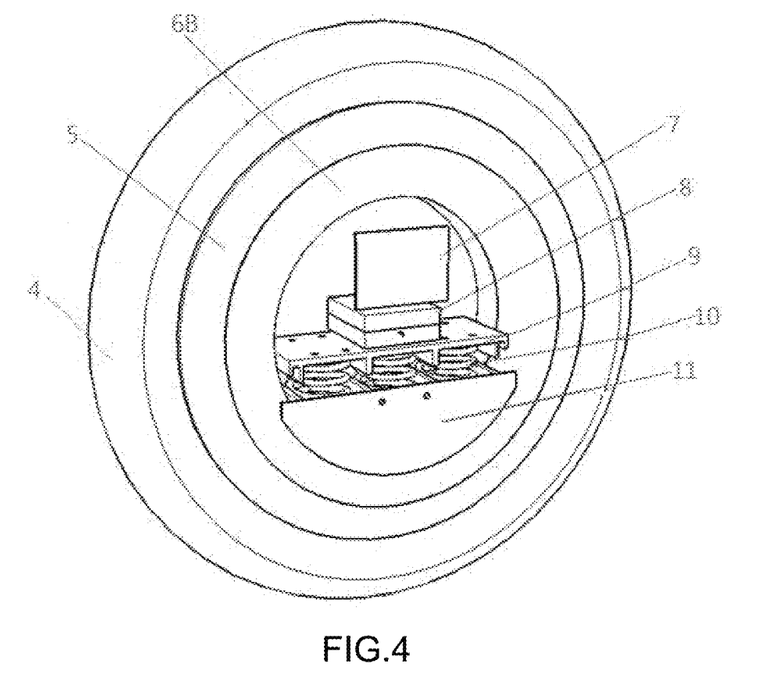
FIG. 4 illustrates the structure of one side of the boot with the wearing mechanism being removed.
Figure 5:
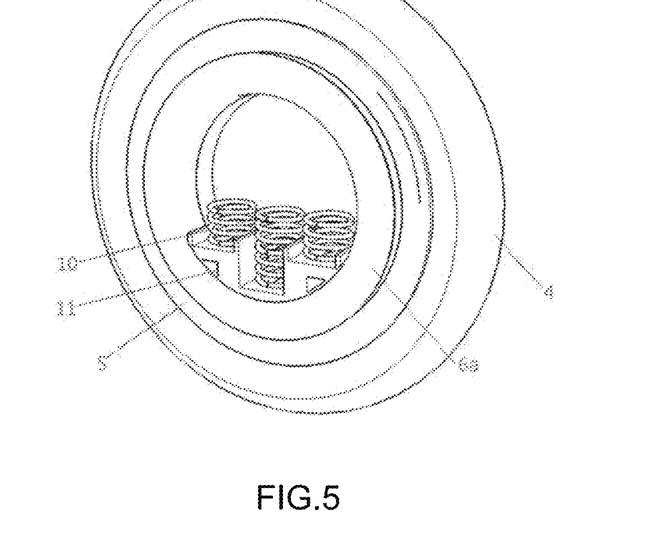
FIG. 5 illustrates the structure of another side of the boot with the wearing mechanism and the shock reduction spring base cover being removed.

The drive mechanism 23 comprises a circular electromagnetic motor having a hollowed center or a circular motor having a hollowed center and without an iron core, and also an inner wall of a super thin bearing 13 having a large diameter bore.

Figure 8:
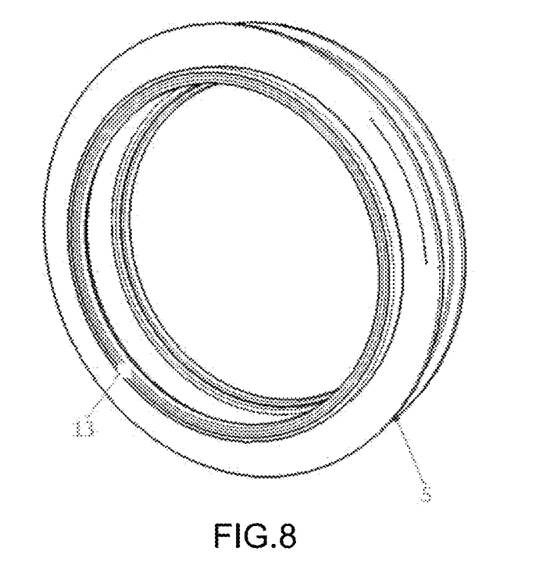
FIG. 8 illustrates the connection between the wheel hub and the super thin bearing with a large diameter bore of the motion transmission part of the present invention.
Figure 9:
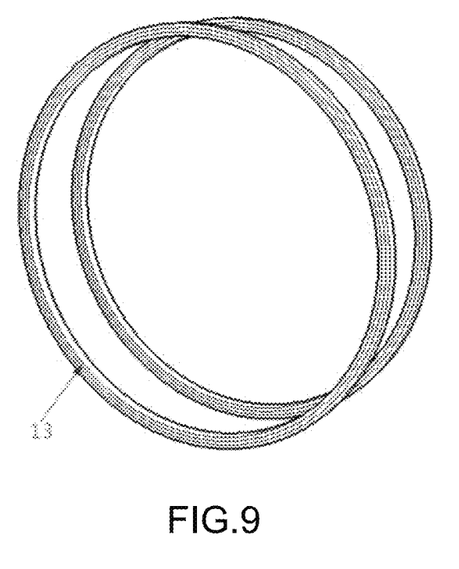
FIG. 9 is a structural view of the super thin bearing with a large diameter bore of the motion transmission part of the present invention.

The motion transmission mechanism 24 comprises an outer wall of the super thin bearing 13 having the large diameter bore, a wheel hub 5 and a rubber tire 4.

The power mechanism 25 comprises a specified type separable modular batteries 8, and includes a battery smart protection control board, ports and connection wire.

The control mechanism 26 is a control board 7 being a single board unit integrated with a microprocessor, an angular speed sensor, an acceleration sensor, a pressure sensor and associated electronic components.

The wearing mechanism 21 is a mechanism that fixes and connects the parkour wheeled boot with the human body. As noted above, the wearing mechanism 21 comprises the pedal 3, the pedal fixation rack 2, the upper calf supporting plate 1a, the lower calf supporting plate 1b, and the magnetic pieces or the buckle and belt for fixing with the human body. As noted, a calf supporting plate is divided into the upper calf supporting plate 1a and the lower calf supporting plate 1b, rendering the calf supporting plate foldable or telescopic. By means of magnetic force or buckle and belt mechanism, the calf supporting plate is fixed and connected with a calf of a user. The pedal 3 is mounted on the pedal fixation rack 2. The pedal 3 fixes and connects with a foot of the user also through magnetic force or buckle and belt mechanism.

The pedal fixation rack 2 of the wearing mechanism 21 and the shock reduction spring seat cover 9 of the shock reduction mechanism 22 are fixedly connected. Shock reduction springs 10 are provided beneath the shock reduction spring seat cover 9. The shock reduction springs 10 support the weight of the user. The shock reduction springs 10 are mounted on the semi-circular shock reduction spring base 11. Compressibility of each of the shock reduction springs 10 is maintained at around 2 cm. As noted above, the power mechanism 25 comprises specified type separable modular batteries and also their ports. "Specified type" here means specifying a certain capacity for one independent modular unit; "separable" here means separable with the boot under weight limitation. The specified type separable modular batteries supply power to the boot through connection wire or wireless means. Each modular unit may quickly assemble with other modular units through hidden fasteners to provide power for continuous use for long distance travel.

The power mechanism 25 is provided on a top part of the shock reduction mechanism 22. The power mechanism 25 comprises batteries and ports. The batteries are the separable modular batteries 8 which can be instantly inserted or removed according to practical needs. When being separated, the separable modular batteries 8 are carried at the waist of the user, and provide power to the parkour wheeled boot through connection wire or wireless means. "Modular" here means each independent modular unit has a specified capacity of 100 WH-160 WH. Each modular unit may quickly assemble with other modular units through hidden fasteners to form a battery assembly having a large capacity so as to increase the capability of the boot to travel a long distance.

The control board 7 of the control mechanism 26 is positioned on a top part of the power mechanism 25. As noted above, the control board 7 is a single board unit, on which the microprocessor and the associated electronic components are arranged. Also arranged on the control board 7 are the angular speed sensor, the acceleration sensor, and the pressure sensor which controls power output and power cut of the whirling wheel in accordance with alternate movement of user's feet on and off the ground.

The semi-circular shock reduction spring seat 11 being a lower part of the shock reduction mechanism 22 is connected with the drive mechanism 23. As noted above, the drive mechanism 23 comprises the circular electromagnetic motor having a hollowed center or the circular motor having a hollowed center and without an iron core, and also the inner wall of the super thin bearing 13 having a large diameter bore. The circular electromagnetic motor having a hollowed center or the circular motor having a hollowed center and without an iron core is encapsulated by a U-shape end cap stator supporter. The U-shape end cap stator supporter is divided into a left part and a right part, namely a first U-shape end cap stator supporter 6a and a second U-shape end cap stator supporter 6b, mutually engaged from two opposite ends for easy mounting and disassembly. An interior side of the U-shape end cap stator supporter is tightly fitted with an inner diameter of the super thin bearing 13 having a large diameter bore. An outer diameter of the super thin bearing 13 having a large diameter bore is tightly fitted with the wheel hub 5 of the motion transmission mechanism 24.

Figure 6:
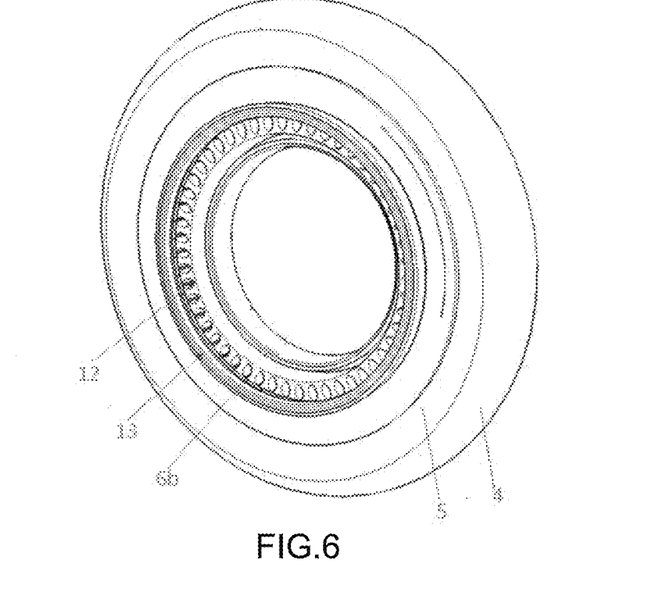
FIG. 6 is a structural view of the stator iron core of the motor part of the present invention.
Figure 7:
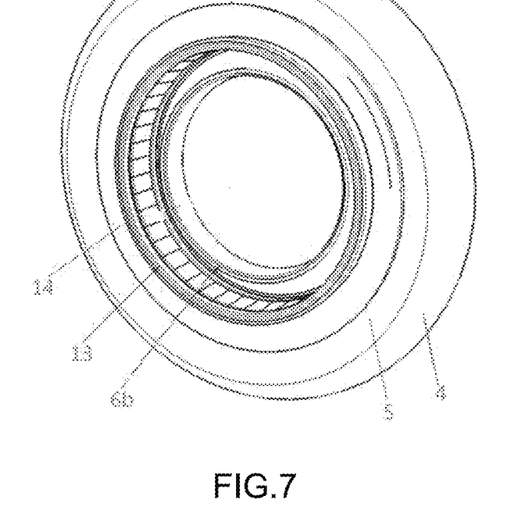
FIG. 7 is a structural view of the outer rotor of magnetic steel of the motor part of the present invention.

Outer rotor 14 of magnetic steel surrounds an external side of a stator iron core 12 of the drive mechanism 23. The outer rotor 14 is arranged around an inner wall of the wheel hub 5. An outer side of the wheel hub is mounted with the rubber tire.

Due to the use of circular electromagnetic motor having a hollowed center or the circular motor having a hollowed center and without an iron core, the weight of the motor can be maximally reduced, the motor efficiency is enhanced and the number of motion transmission components is reduced, thereby lowering the chance of mechanical failure and facilitating installation and maintenance. Each of the parkour wheeled boot has a weight of under 4 kg for easier control by the user.

Although an embodiment of the present invention is shown and described above, it is obvious that a person skilled in this field of art may change, modify, replace or vary the present embodiment without deviating from the principle and essence of the teaching of the present invention. The scope of the present invention is limited by the appended claims and their equivalents.

What is claimed is:

1. A parkour wheeled boot for increasing moving speed, each being worn at an outer side of a respective leg of a user; the boot on a left leg of the user is symmetrical to the boot on a right leg of the user; each boot comprises a wearing mechanism (21), a shock reduction mechanism (22), a drive mechanism (23), a motion transmission mechanism (24), a power mechanism (25) and a control mechanism (26); wherein the wearing mechanism (21) comprises a pedal (3), a pedal fixation rack (2), an upper calf supporting plate (1a) and a lower calf supporting plate (1b); the pedal (3) is mounted on the pedal fixation rack (2); the pedal fixation rack (2) is fixedly connected to a shock reduction spring seat cover (9); the lower calf supporting plate (1b) is connected with an outer side of a semi-circular shock reduction spring seat (11); the upper calf supporting plate (1a) and the lower calf supporting plate (1b) are mutually connected through insertion or folding;

the shock reduction mechanism (22) and the wearing mechanism (21) are mutually connected; the shock reduction mechanism (22) comprises the semi-circular shock reduction spring seat (11), shock reduction springs (10) and the shock reduction spring seat cover (9); the shock reduction springs (10) are mounted on the semi-circular shock reduction spring seat (11); the shock reduction springs (10) and the semi-circular shock reduction spring seat (9) are connected via screw bolts; the semi-circular shock reduction spring seat (11) of the shock reduction mechanism (22) is connected with the drive mechanism (23); compressibility of each of the shock reduction springs (10) is around 2 cm to ensure better buffering ability of the boot on rough road surfaces;

the drive mechanism (23) comprises a circular electromagnetic motor having a hollowed center or a circular motor having a hollowed center and without an iron core, formed by a first U-shape end cap stator supporter (6a), a second U-shape end cap stator supporter (6b), a super thin bearing having a large diameter bore (13), a stator iron core (12), and an outer rotor of magnetic steel (14); the stator iron core (12) is provided inside the super thin bearing having a large diameter bore (13), and the outer rotor of magnetic steel (14) is provided external to the stator iron core (12); the first U-shape end cap stator supporter and the second U-shape end cap stator supporter are parts of the drive mechanism (23) visible from outside; interior sides of the first and second U-shape end cap stator supporters are tightly fitted with an inner wall of the super thin bearing having a large diameter bore (13), and the first and second U-shape end cap stator supporters are driven by power generated by separation magnetic force from the outer rotor of magnetic steel (14), the stator iron core (12) and windings;

the motion transmission mechanism (24) comprises an outer wall of the super thin bearing having the large diameter bore (13), a wheel hub (5) and a tire (4); the motion transmission mechanism (24) has a function of transferring the power transmitted from the drive mechanism (23) to rolling motion on the ground surface;

the power mechanism (25) comprises specified type separable modular rechargeable batteries (8) and ports thereof; the power mechanism (25) supplies power to the entire boot; specified type is defined as specifying a certain capacity for one independent modular unit; separable is defined as separable with the boot under weight limitation; during separable condition of the batteries, power is supplied to the boot through connection wire or wireless means; each modular unit is capable of quickly assembling with other modular units through hidden fasteners to provide power for continuous use for long distance travel;

the control mechanism (26) is a control board (7) being a single board unit; the control board (7) is an equipment control center; the control board (7) not only has relevant components found in a control board of a conventional self-balancing vehicle, including an angular speed sensor and an acceleration sensor, but also has a pressure sensor which controls power output and power cut of the whirling wheel in accordance with alternate movement of the user's feet on and off the ground.

2. The parkour wheeled boot for increasing moving speed as claimed in claim 1, wherein the shock reduction mechanism (22), the drive mechanism (23), the motion transmission mechanism (24), the power mechanism (25) and the control mechanism (26) together form a power wheel; the power wheel is an independent self-balancing power wheel having a weight under 4 kg and a size of 6-20 inches; each power wheel is fixed to an outer side of a respective leg of the user; the power wheels on both legs of the user move to advance the body forward in accordance with natural alternate movement of the feet of the user.

3. The parkour wheeled boot for increasing moving speed as claimed in claim 1, wherein when power is shut down or depleted, the boot still provides non-powered assistance in continued travelling because it is designed in accordance with the natural physical development of human beings and operates in accordance with walking traits of human beings.

* * * * *